June 19, 1945.  G. NIKI  2,378,574
APPARATUS FOR MANUFACTURING PILE FABRIC, SUCH AS CARPET
Filed July 20, 1940  6 Sheets-Sheet 1
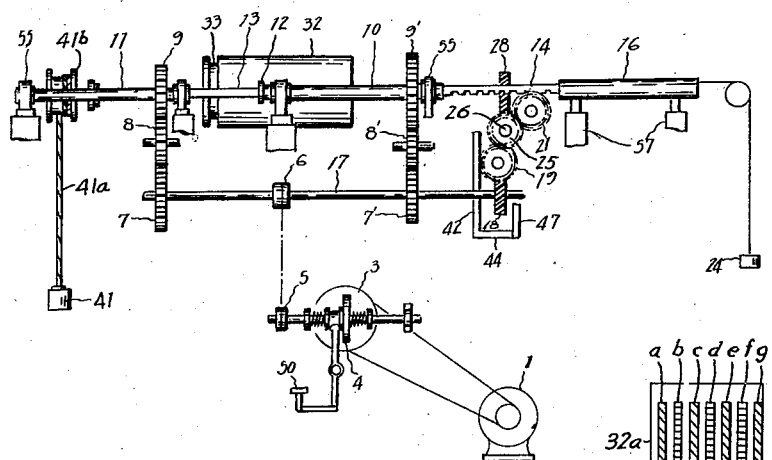
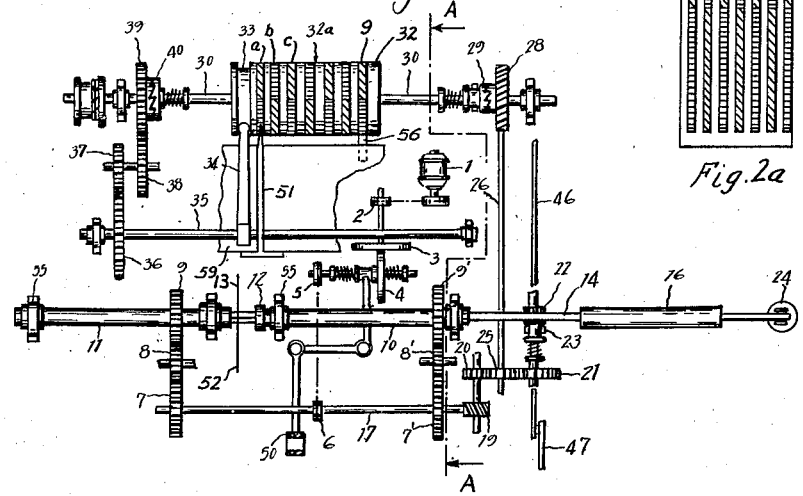
INVENTOR.
GENKICHI NIKI
BY
ATTORNEYS.

June 19, 1945. G. NIKI 2,378,574
APPARATUS FOR MANUFACTURING PILE FABRIC, SUCH AS CARPET
Filed July 20, 1940 6 Sheets-Sheet 3
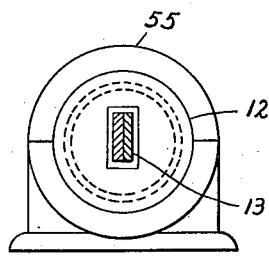
Fig. 6
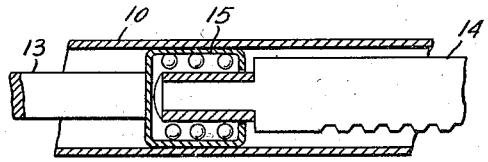
Fig. 7 Fig. 8
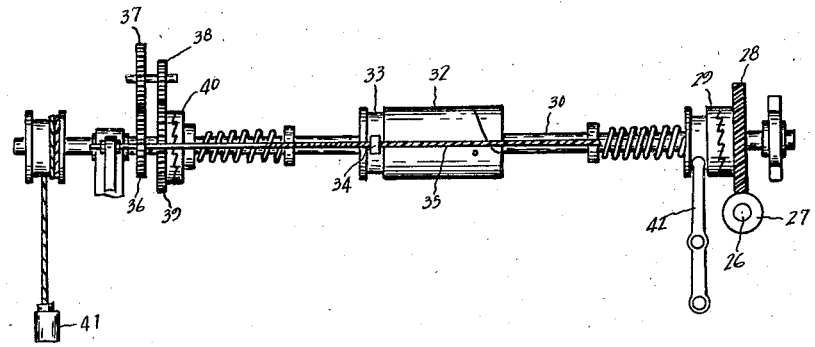
Fig 9
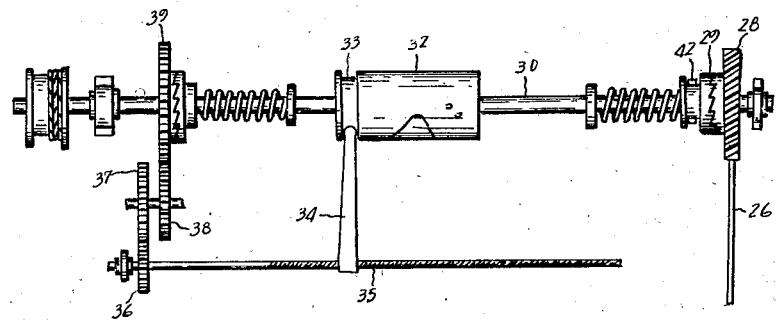
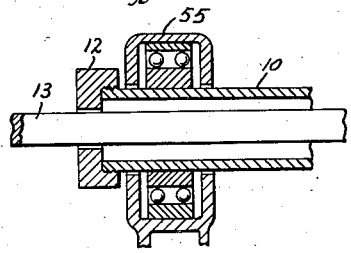
Fig. 5
INVENTOR.
GENKICHI NIKI
BY
Williams, Bradbury & Hinkle
ATTORNEYS.

June 19, 1945.　　　　　G. NIKI　　　　　2,378,574
APPARATUS FOR MANUFACTURING PILE FABRIC, SUCH AS CARPET
Filed July 20, 1940　　　6 Sheets-Sheet 4

INVENTOR.
GENKICHI NIKI
BY
ATTORNEYS.

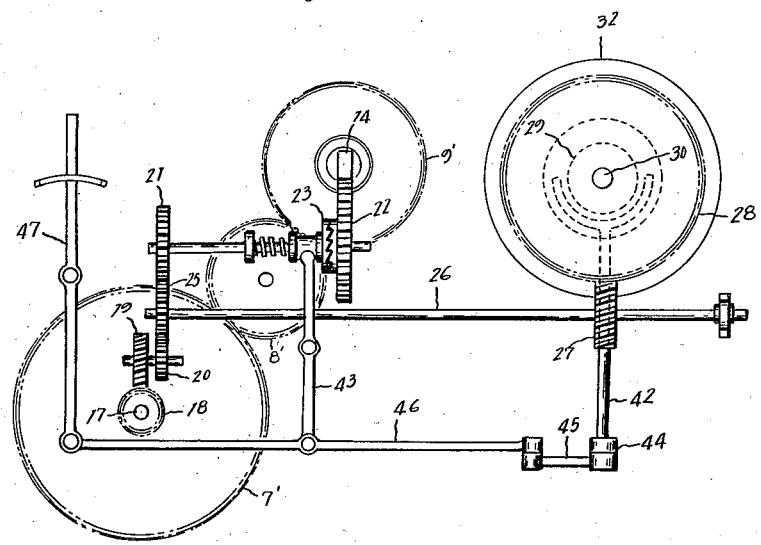
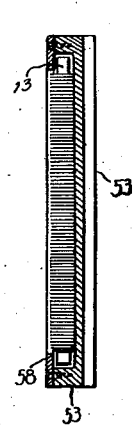
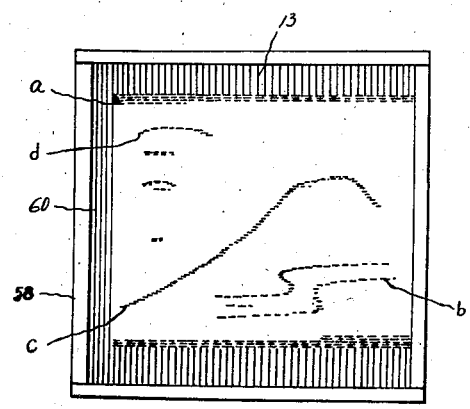

June 19, 1945.　　　　　G. NIKI　　　　　2,378,574
APPARATUS FOR MANUFACTURING PILE FABRIC, SUCH AS CARPET
Filed July 20, 1940　　　　6 Sheets-Sheet 6

INVENTOR.
GENKICHI NIKI
BY
ATTORNEYS.

Patented June 19, 1945

2,378,574

UNITED STATES PATENT OFFICE 2,378,574

APPARATUS FOR MANUFACTURING PILE FABRIC, SUCH AS CARPET

Genkichi Niki, Shibuyaku, Tokyo, Japan; vested in the Alien Property Custodian

Application July 20, 1940, Serial No. 346,496

3 Claims. (Cl. 154—1)

The present invention relates to a new and improved process and apparatus for manufacturing pile fabrics, such as carpet.

One object of the present invention is to provide a new and improved method and apparatus for manufacturing pile fabric which will provide each carpet with a different design and in which the finished product will have the advantages of a hand-woven fabric.

Another object of the present invention is to provide a new process and apparatus which is adapted to produce fabric of any predetermined size or shape.

Another object of the present invention is to provide an apparatus for producing pile fabric which is simple and economical to manufacture.

Another object of this invention is to provide a winding apparatus adapted to be used for winding threads of different colors on successive holders according to corresponding colors on a design sheet, in combination with means driven by the apparatus and associated with the design sheet for indicating when the winding colors are to be changed.

Another object of the present invention is to provide a new and improved method and apparatus for manufacturing pile fabric of any desired size or shape having a wide breadth and short roots of pile in a simple manner by employing reduced original designs and slender bars.

Figure 3:
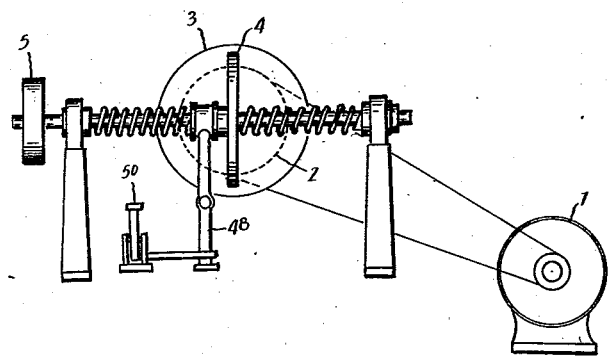
Figure 4:
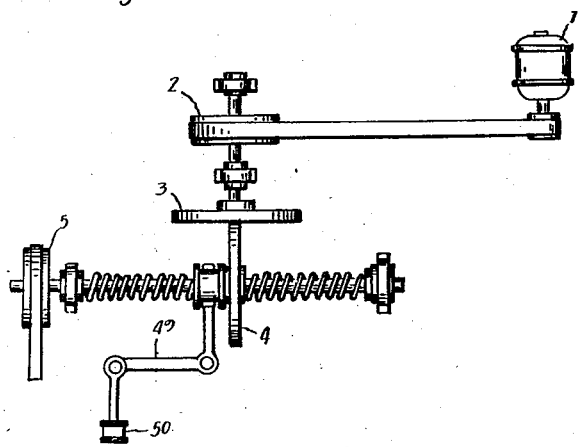
Figure 14:
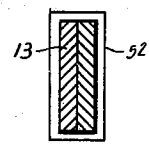
Figure 13:
Figure 12:
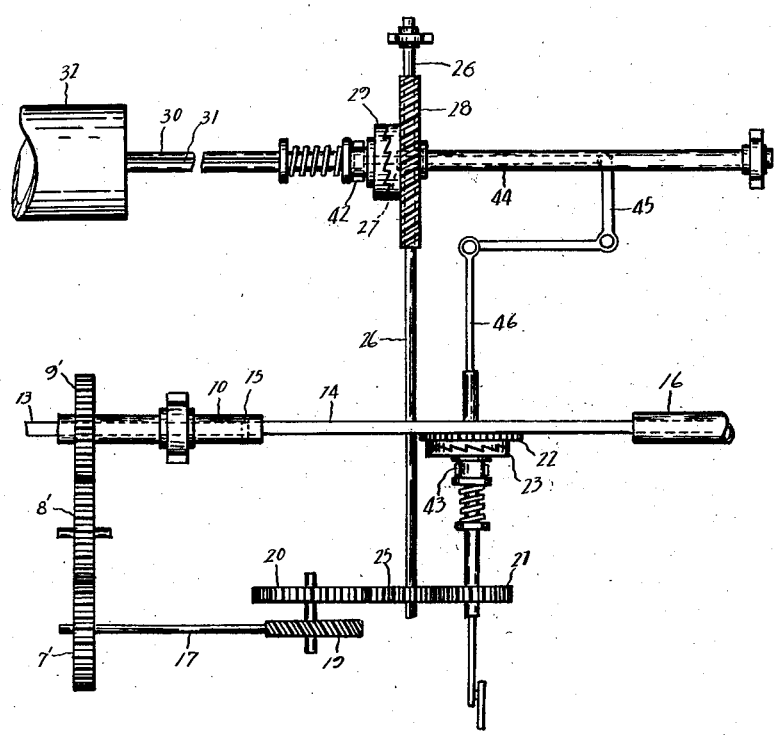

Other objects and advantages of the present invention will become more apparent from the following description, reference being had to the accompanying drawings:

Fig. 1 is a front view of the apparatus, Fig. 2 a plan view of the same and also showing a design sheet 32a attached to the design cylinder 32. Fig. 2A is a plan view of the design sheet detached from the cylinder, Fig. 3 a front view similar to the lower portion of Fig. 1 of a friction clutch, Fig. 4 a plan view of the same, Fig. 5 a detail longitudinal section showing a mechanism for rotating bars around which threads are wound, Fig. 6 a cross section of the same, Fig. 7 a detail longitudinal section of a mechanism for moving a rack, Fig. 8 a front view of an apparatus for feeding and rotating a cylinder, Fig. 9 a plan view of the same, Fig. 10 an elevational view, seen from the left, of certain parts which appear on Fig. 2 and taken along line AA, Fig. 11 a view looking at the right end of Fig. 2, showing a clutch and transmission mechanism for the cylinder and bars, Fig. 12 a plan view of the same, Fig. 13 a perspective view of the bars around which threads are wound, Fig. 14 a cross section of the same, Fig. 15 a plan view showing how the bars are set on edges in parallel and put in a frame, Fig. 16 a longitudinal section of the same, and Fig. 17 a sectional view showing how the bars and associated thread windings are assembled upon a lining, and also how the bars are subsequently removed while cutting the windings.

Referring to the drawings tubes 10, 11 and 16 are arranged in a straight line with suitable spaces between them. The tubes 10 and 11 are mounted on rotatable bearings 55 and the tube 16 is supported by supports 57.

The tubes 10 and 11 are driven from a shaft 17 by means of gears 7', 8' and 9' and 7, 8 and 9 respectively, said shaft, in turn, being driven by a motor. The tube 10 is adapted to receive two slender bars 13 joined together, (Figs. 1, 7, 12 and 13) on which threads 52 are wound, the left ends of the bars being inserted in the tube 11. At the end of the tube 10 is screwed a cap 12 having a rectangular hole through which the bars 13 move, (Figs. 5 and 6) thereby enabling the latter to rotate together with the tubes 10 and 11. In tube 16 is inserted a rack 14 which is driven from a shaft 17 by means of gears 21, 25 and 20 and a pinion 22 on which a clutch 23 is provided (Figs. 2 and 11). At the end of the rack 14 a cap 15 is mounted rotatably and adapted to be inserted in the tube 10 so that the rack moves forward in a straight line without friction with the tube 10 (Fig. 7).

The right hand end of the bars 13 is engaged by the cap 15 and the bars are pushed thereby to the left, thus enabling threads 52 of yarn to be wound around the bars at a point between the tubes 10 and 11. As the rotating bars move to the left in Fig. 2 past the winding point, the thread will be distended along the length of the bars. At the right hand end of the rack 14 a weight 24 is hung so that the rack returns to its original position as soon as the clutch 23 is disengaged in a manner to be later described.

Figure 10:
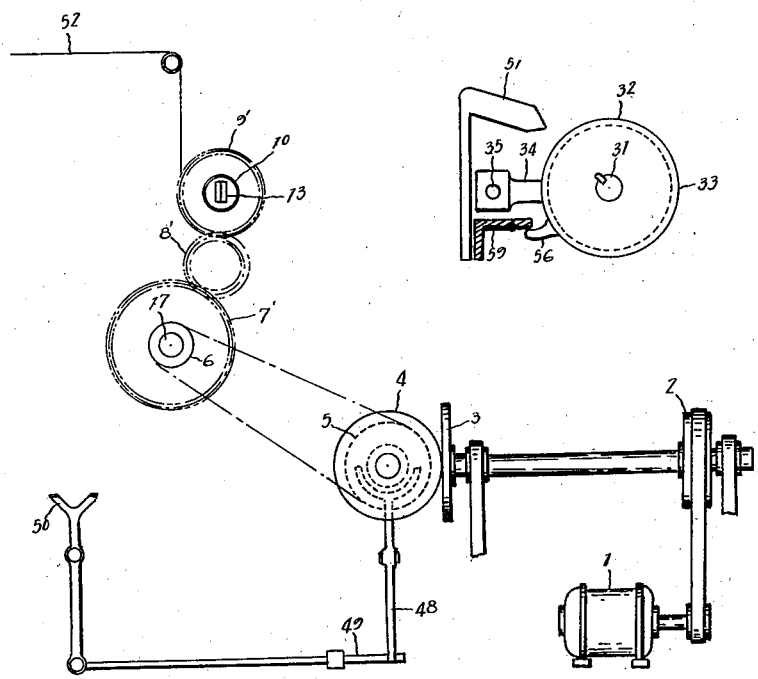

The cylinder 32 is slidably mounted on a shaft 30 provided with a groove 31 for a key (Fig. 10). One end of a handle 34 is secured on a screw rod 35 and the other end of said handle is fitted in a circular groove 33 provided along the periphery of the end portion of the cylinder 32. The cylinder 32 is rotated by means of the shaft 30 and the mechanism mentioned hereinafter. It can also be moved to the left by means of the handle 34 in a step by step manner.

At the right hand end of the shaft 30, there is provided a clutch 29 and a worm gear 28 adapted to engage a worm 27 provided at the rear end of the shaft 26, (Figs. 2 and 11). At the left hand end of shaft 30, there is provided a clutch 40 and a gear 39, said gear 39 driving screw rod 35 by means of gears 38, 37 and 36. At the outer extremity of the left hand end of the shaft 30, there is provided a weight 41.

The clutches 29 and 40 have teeth cut opposite to each other, and the motive power is transmitted to the worm gear 28 through the shaft 26 from gear 25, and thus the shaft 30 and associated cylinder 32 are rotated in a counter clockwise direction in Fig. 10. While the cylinder 32 is rotated, the clutch 40 is disengaged. The engaging teeth of the clutch 40 will ratchet over each other due to the pitch of the teeth in the respective clutch faces. Therefore, the screw rod 35 will not be rotated to advance cylinder 32 longitudinally on shaft 30, however the weight 41 will be lifted as cord 41a is wound around drum 41b fixed on shaft 30, when the clutch 29 is disengaged and the shaft 30 is rotated in opposite direction by the action of the descending weight 41. The cylinder 32 also rotates in the opposite direction until claw 56 engages stop 59, at which time the cylinder 32 occupies its original position.

While the cylinder is returning to original position, the teeth of the clutch 40 will engage each other and then rotate the screw rod 35 through the gears 39, 38, 37 and 36, and these gears will advance handle 34 and cylinder 32 along shaft 30 to the left a distance equal to the space between adjacent columns, for example, the distance between columns a and b on design sheet 32a. Hence, the position of the original design on the cylinder 32 changes in conjunction with the stationary indicator 51.

A motor 1 is connected with the shaft 17 by means of a belt 2, friction clutch 3 and 4 and wheels 5 and 6. The friction clutch is connected with a pedal 50 through levers 48 and 49. When the pedal 50 is engaged, the power is transmitted to the shaft 17 through the friction clutch, and the tubes 10 and 11 and the bars 13 are rotated through the shaft 17, gears 7, 8 and 9 and 7', 8', and 9'. The rack 14 is also acted upon through the worm 18, worm gear 19, gears 20, 25 and 21 and pinion 22, thereby moving the rack 14 forward and feeding the bars 13 past the winding point and into the tube 11. The cylinder 32 is simultaneously rotated from shaft 17 in timed relation to the axial movement of bars 13 past the winding point, the driving connection between the shaft and cylinder comprising the shaft 30, shaft 26 of the gear 25, worm 27 and worm gear 28.

Thus, during the forward movement of the rack 14 and bars 13, a colored thread 52 is fed by hand to the bar 13 between the tubes 10 and 11 corresponding to the colors on sheet 32a disposed beneath the indicator 51. Of course, the thread must be fastened at the left end of the bar to start winding operations, and when it is necessary to change the thread, for instance, to use a thread of a different color, winding operations must be stopped, and then the thread in use is cut and replaced with the new thread, these threads being tied together by hands.

Clutches 23 and 29 are respectively operated by levers 43 and 42. These levers are interconnected by link 44, bell crank 45 and link 46, said link 46 being connected to operate handle 47.

Each time the threads of different colors corresponding to the colors and patterns in the columns a to g inclusive of the original design sheet 32a have been wound around the bars, the handle 47 is operated to disengage the clutches 23 and 29 to allow the cylinder 32 and rack 14 to return simultaneously to their original positions by the action of weights 41 and 24 respectively; and, while the cylinder is rotating to its original position, as shown in Fig. 10, the cylinder is also advanced to the left along shaft 30 to position the adjacent column on the design sheet opposite the indicator 51. Thus, it is seen the cylinder 32 makes one complete oscillation for each column a to g inclusive; and, during the return swing of each oscillation, the cylinder is advanced longitudinally to present the succeeding columns beneath the indicator 51.

To work the apparatus shown, the left hand portion of the bars 13 is brought into place between the tubes 10 and 11 and the cylinder 32 is brought to a suitable position at the right hand end portion of its shaft so that the first column a on the left of the original design sheet 32a is disposed opposite the indicator 51.

Power is then transmitted to the shafts 17 and 30 to rotate the bars and cylinder. The bars 13 are rotated at a speed of about 1,500 revolutions per minute while they are moved forward from the tube 10 so that the threads 52 are wound around the bars.

By referring to Figs. 2 and 2A, it will be noted that the lower portion of column a is blue and the upper portion is green. When the design sheet 32a is placed upon cylinder 32 and the cylinder is in initial starting position, the lower edge of column a (Fig. 2A) is disposed opposite the pointer 51. This will indicate to the operator that a blue thread is to be wound upon the rotating axially advancing bars 13. When the green portion of column a has advanced to a point beneath pointer 51, the operator stops the machine and replaces the blue thread with a green thread, and then the winding is continued until the remainder of column a has passed beneath the indicator 51.

At this time, the clutch 29 is disengaged to allow the cylinder 32 and design sheet 32a to reversely rotate to starting position (Fig. 10) and also allow the cylinder and sheet to advance axially of shaft 30 until the lower edge of the succeeding column b is disposed beneath indicator 51. Then the bars 13 having blue and green threads wound thereon are replaced by empty bars 13. A similar winding operation is then repeated. Since the lower portion of the column b is green, a change in the thread color is not necessary until the upper blue portion of column b has advanced beneath the indicator. The same operations are repeated for successive columns until the entire pile design has been wound. The movement of the chart 32a is synchronized with the winding apparatus and thus furnishes a visual guide to the operator so that the necessary thread changes can be made a the proper time and the progress of winding the pile design can be ascertained at a glance. The same operations are repeated for the second column, and so on.

After the threads have been wound around the bars for the whole design, the bars are set on edges in parallel as shown in Figs. 15 and 16, so that the threads present the reverse design, and are put in a frame 53 and tightened by inserting filling 60.

Figure 17:
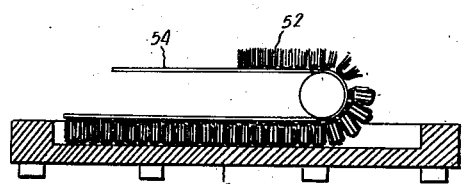

A lining 54 is pasted on the threads and then subjected to drying. Then, the bars in the frame are removed in order as shown in Fig. 17, the threads on the opposite surface being cut with knives inserted between two bars while the fabric is taken up. In this manner, carpets of pile fabric with the same design as the original can be manufactured.

According to this invention, it is possible also to manufacture two sheets of carpet simultaneously by winding threads around each bar and setting up the bars in parallel and pasting linings on both faces of the threads around the bars, and cutting the threads halfway between the linings.

What I claim as new and desire to be secured by Letters Patent is as follows:

1. In a machine for the manufacture of pile fabric, spaced rotatably aligned supports, a bar detachably and slidably mounted in said supports for movement along the longitudinal axes of the supports, said bar also being rotatable with the supports, means for guiding a thread onto said bar at a point between said spaced supports, means for moving said bar axially of said point, means for rotating said support and said bar during said last named axial movement, an oscillatably mounted cylinder for supporting a design sheet, said supported sheet having circumferentially extending parallel columns thereon representing a design to be reproduced, a stationary indicator disposed adjacent said supported sheet, means for moving one of said columns longitudinally past said indicator during the forward oscillation of said cylinder and means for axially advancing said cylinder during the successive reverse oscillation to position the succeeding column adjacent said indicator whereby the progress of reproducing said design will be indicated on said sheet by said indicator.

2. A pattern mechanism for manufacturing pile tufting, the combination of an oscillatably mounted cylinder for supporting a design sheet, said supported sheet having circumferentially extending columns thereon representing a pile design to be reproduced, a stationary indicator disposed adjacent said supported sheet, means for moving one of said columns longitudinally past said indicator during each oscillation of said cylinder in one direction, means for axially advancing said cylinder during each oscillation of said cylinder in the opposite direction to thereby position succeeding columns adjacent said indicator, a rotary arbor upon which a thread is wound, a stationary guide for said thread, and means for axially advancing said arbor past said guide in timed relation to the first named direction of oscillation of said cylinder and associated design sheet.

3. In an apparatus for manufacturing pile tufting, the combination of an oscillatably mounted cylinder for supporting a design sheet, said supported sheet having circumferentially extending columns thereon representing a design to be reproduced, a stationary indicator disposed adjacent said supported sheet, means for moving one of said columns longitudinally past said indicator during the forward oscillation of said cylinder, means for axially advancing said cylinder during the succeeding reverse oscillation to position a succeeding column adjacent said indicator, a rotary arbor upon which a thread is wound, a stationary guide for said thread, and means for axially advancing said arbor past said guide in timed relation to the forward oscillation of said cylinder and associated design sheet.

GENKICHI NIKI.